April 10, 1956    J. A. WHITE, JR    2,741,173
TILLER IMPLEMENT FRAME
Filed Sept. 2, 1952    4 Sheets-Sheet 4

INVENTOR
JOHN A. WHITE JR.
BY
Webster & Webster
ATTYS

United States Patent Office 2,741,173
Patented Apr. 10, 1956

2,741,173

TILLER IMPLEMENT FRAME

John A. White, Jr., Gilroy, Calif., assignor to Be-Ge Manufacturing Co., Gilroy, Calif., a corporation of California Application September 2, 1952, Serial No. 307,429

1 Claim. (Cl. 97—243)

The major object of the present invention is to provide an improved agricultural or tillage implement, especially a rotary bed tiller or multiple rotary harrow; the implement being of the type which is wheel-supported, tractor pulled, and includes multiple rotary tillers driven from the rear power take-off shaft of the tractor.

A further object of the invention is to provide a novel implement, of the type described, wherein the rotary tiller units may be vertically adjusted in unison to selected working depth, and set to run in a horizontal position or a position canted upwardly at the front, dependent on soil conditions.

The structural arrangement is such that the working depth adjustment can be made without materially altering the working position of the rotary tillers relative to a horizontal plane.

Another object of the present invention is to provide the implement with rotary tillers, each of which is of novel construction, particularly as to the manner of attachment of the harrow spikes or teeth thereon.

A still further object of the invention is to provide a rotary bed tiller wherein the rotary tillers are adjustable for different crop row widths.

A separate object of the invention is to provide a rotary bed tiller which is designed for ready and economical manufacture; the implement—when in use—functioning smoothly and positively to work or till the soil of a crop row from the top down to a predetermined depth, effectively weeding the row and leaving it mulched and cultivated on top but firm below, as desired.

A further object of the invention is to provide a practical, reliable, and durable rotary bed tiller, and one which will be exceedingly effective for the purpose for which it is designed.

These objects are accomplished by means of such structure and relative arrangement of parts as will fully appear by a perusal of the following specification and claim.

Figure 1:
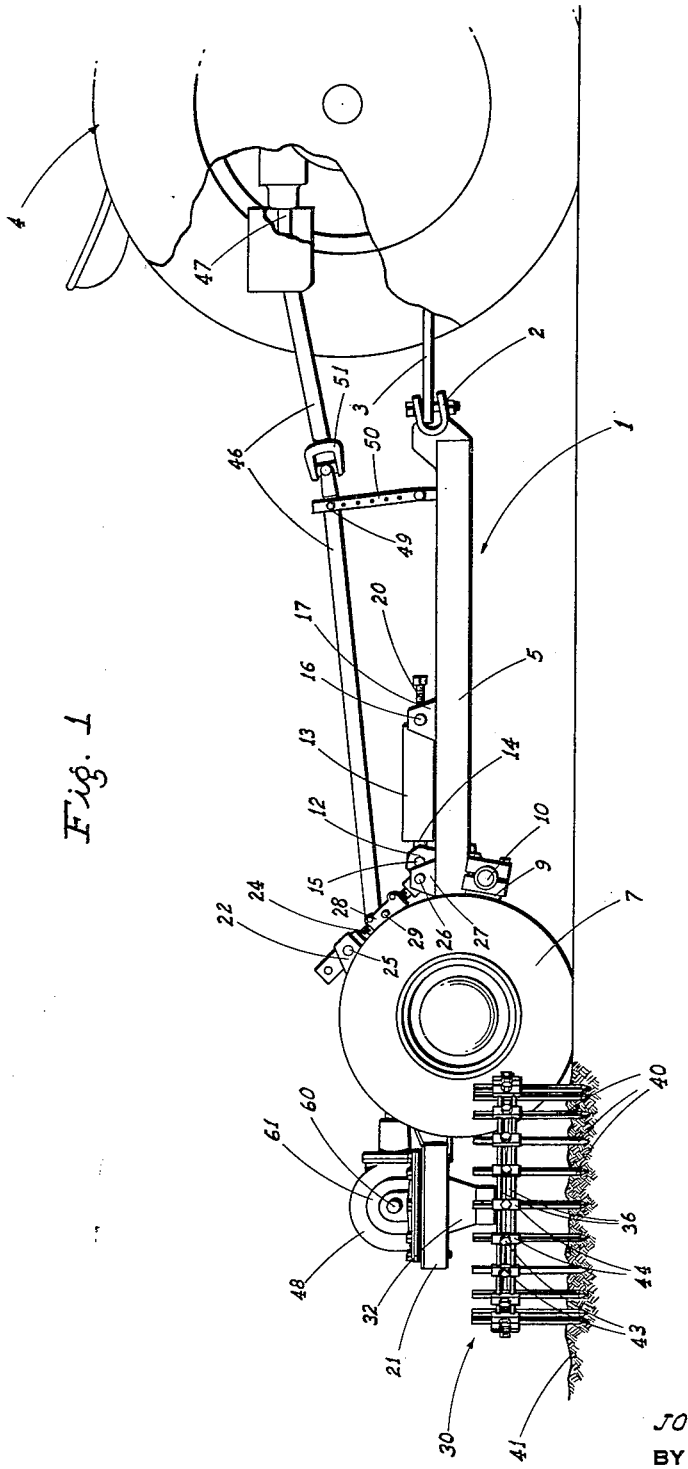
Fig. 1 is a side elevation of the improved rotary bed tiller as in use.
Figure 2:
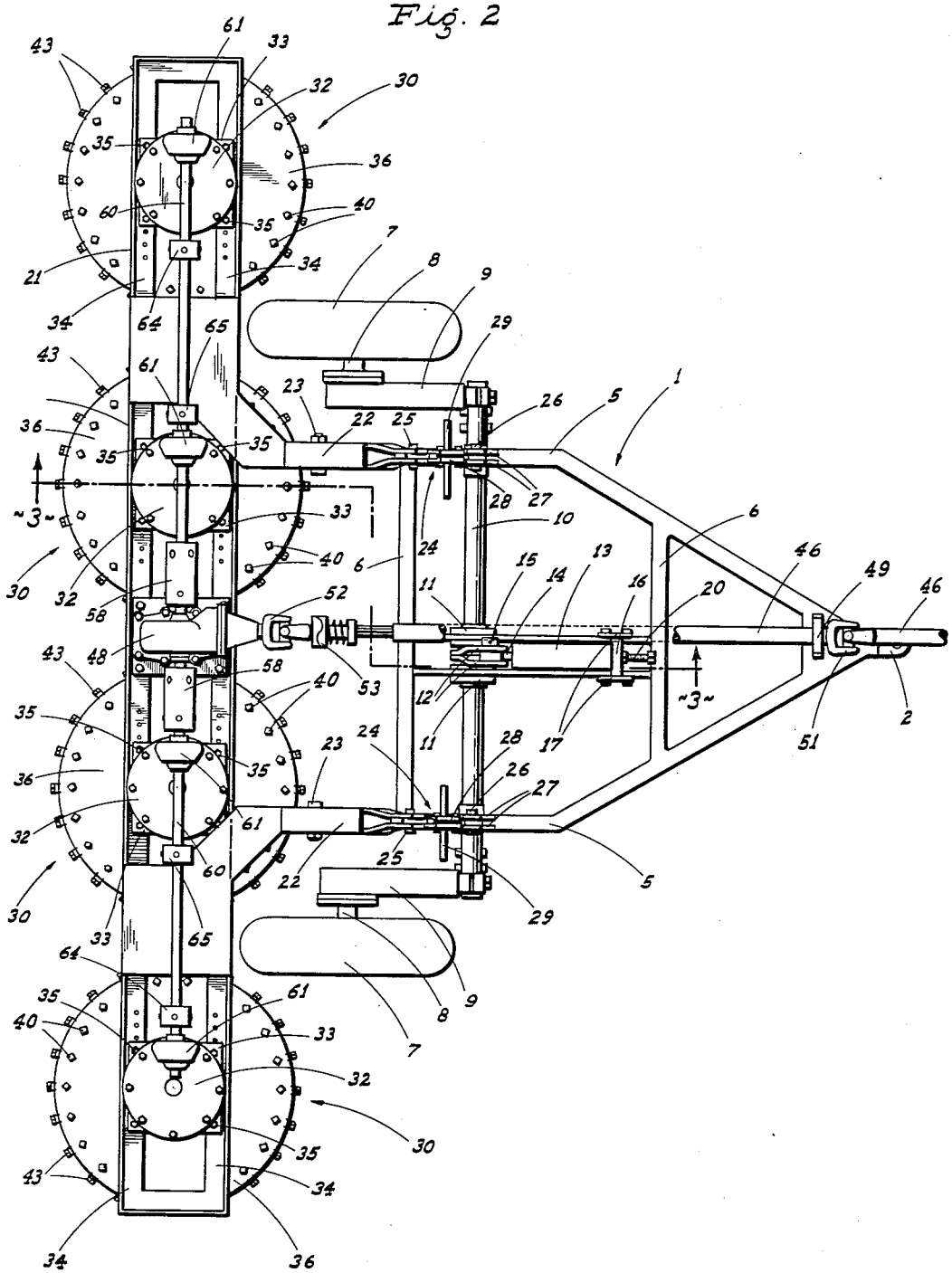
Fig. 2 is a top plan of the implement.

Referring now more particularly to the characters of reference on the drawings, the implement comprises a longitudinal main frame 1 adapted to be coupled at the front by a hitch 2 with the drawbar 3 of a wheel-type tractor, indicated generally at 4. The longitudinal main frame 1 includes transversely spaced side beams 5 suitably connected together intermediate their ends by cross beams 6. The frame 1 is supported intermediate its ends for travel along, and vertical adjustment relative to, the ground by means of transversely spaced wheels 7 disposed laterally out from the side beams 5 and carried on spindles 8 projecting from crank arms 9. The crank arms 9 extend at a rearward and downward incline from opposite ends of a cross shaft 10 journaled in connection with the frame 1, as at 11.

Intermediate its ends the cross shaft 10 is fitted with an upstanding radial lever arm 12. A power cylinder 13 is disposed longitudinally ahead of the lever arm 12, with the piston rod of said cylinder projecting rearwardly and pivotally connected, as at 15, to the upper end of said lever arm.

At its forward end the power cylinder 13 is pivoted, as at 16, in connection with the main frame 1 by means which include brackets 17.

The power cylinder 13 is interposed in a valve regulated, hydraulic conduit system of generally conventional type (not shown) which includes conduits 18 and 19 leading to opposite ends of said cylinder.

When the power cylinder 13 is actuated to cause extension thereof—i. e. outward projection of the piston rod 14—the radial lever arm 12 is swung in a direction causing raising of the main frame 1 at its rear end. Conversely, when the power cylinder 13 is retracted, the frame 1 lowers at its rear end; such lowering movement being limited by a piston stop screw 20 threaded axially into the cylinder at its forward end.

A relatively elongated, transverse mounting frame 21 is disposed rearwardly of the main frame 1, and such mounting frame 21 is rigidly secured in connection with the rear ends of a pair of inverted bellcrank levers 22 pivoted, as at 23, to the corresponding side beams 5 at the rear end portions of the latter.

A turnbuckle 24 extends at a forward and downward incline from the upper end of each bellcrank lever 22; each turnbuckle being adjustably pivoted at its upper end, as at 25, to the corresponding end of the related bellcrank lever 22, and pivoted at its lower end, as at 26, to a bracket 27 on the corresponding side beam 5. Each turnbuckle 24 includes a turnbuckle body 28 fitted with oppositely projecting handles 29 for manual rotation.

By adjusting the turnbuckles 24, the position of the mounting frame 21 relative to horizontal can be varied, which adjustment is for the purpose hereinafter described.

A transverse row of rotary tillers, each indicated at 30, is disposed beneath the mounting frame 21; such tillers being supported from said frame, and driven, in the manner now to be described.

Each rotary tiller 30 is secured centrally to an upstanding spindle 31 which projects into a gear and spindle housing 32 which extends upwardly through the mounting frame 21, the latter being of open or skeleton type.

Intermediate the top and bottom thereof each gear and spindle housing 32 carries a rectangular attachment plate 33 which rests on the bottom flanges 34 at the front and rear of said frame 21.

Each attachment plate 33 is secured to the flanges 34 in transversely adjustable relation by bolts 35. By adjusting the attachment plates 33 along the frame 21, the implement may be set with the rotary tillers 30 properly spaced for different crop row widths. As each of the rotary tillers 30 is of the same construction, a description of one will suffice for all.

Each rotary tiller 30 comprises a pair of discs 36 superimposed and engaged in matching face to face relation in the central portion, there being secured by bolts 37 to a circular attachment plate 38 on the lower end of the related spindle 31.

Figure 3:
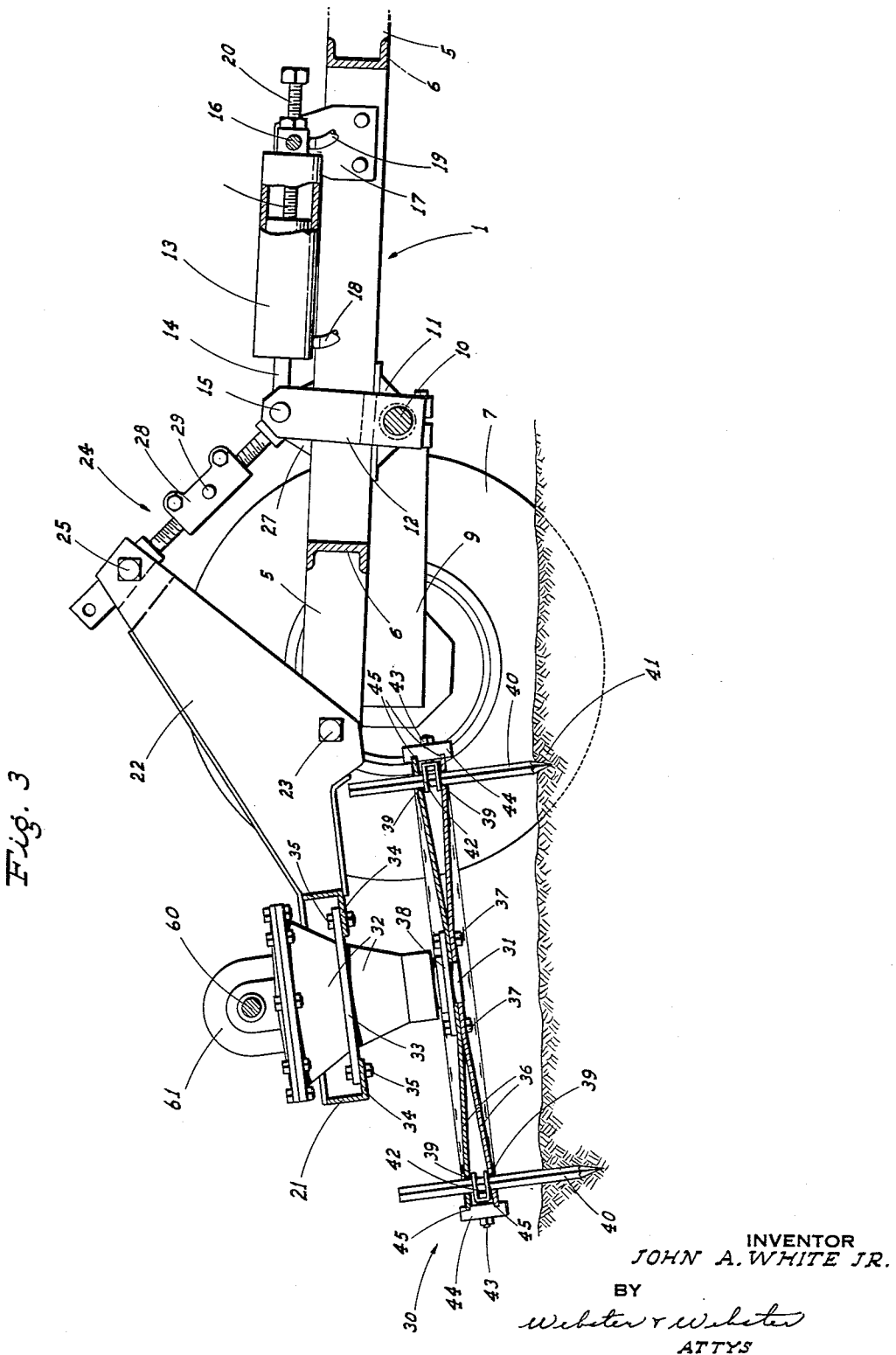
Fig. 3 is a fragmentary longitudinal sectional elevation on line 3—3 of Fig. 2; all but the front and rear harrow spikes being omitted.
Figure 4:
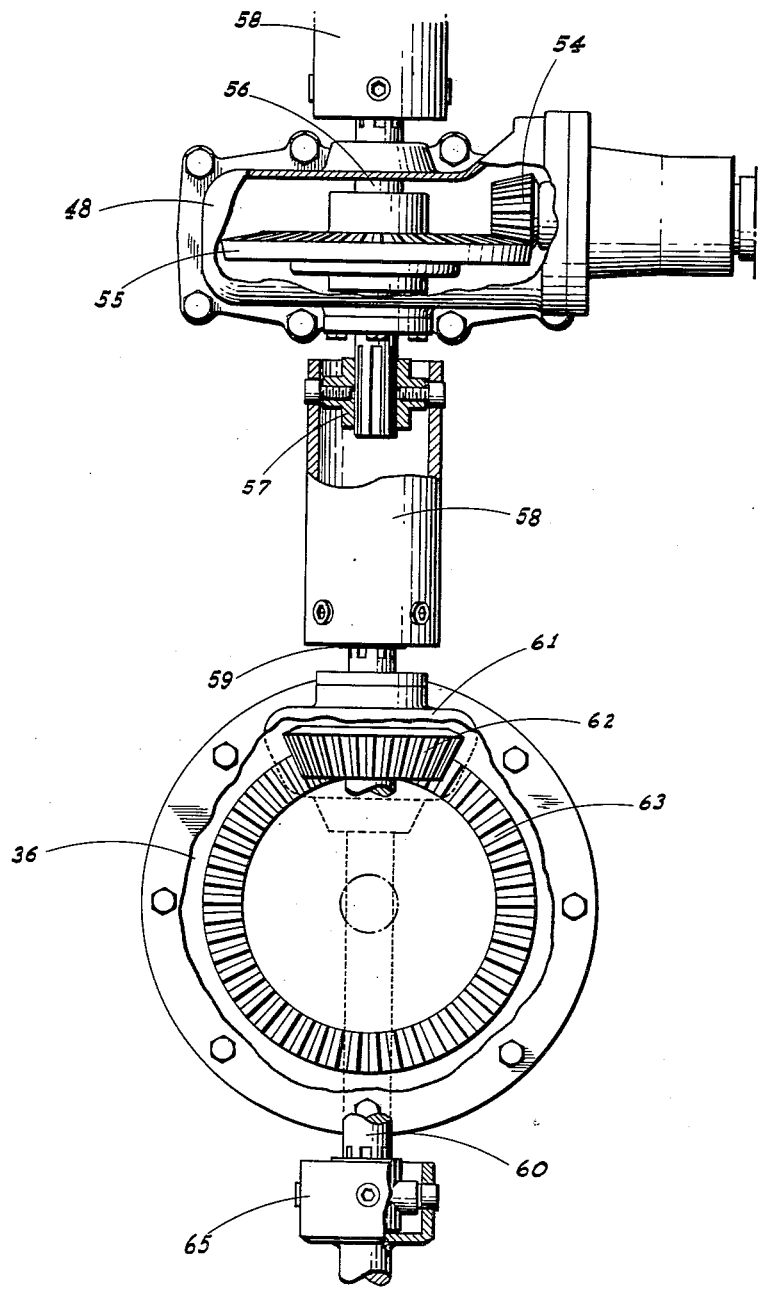
Fig. 4 is an enlarged fragmentary plan view of the tiller driving mechanism.

From such central portion the discs 13 diverge in a radially outward direction until at the peripheral portions said discs have substantial spacing (see Fig. 3). The discs 36 are formed, adjacent but short of the periphery, with a concentric row of circumferentially spaced holes 39, with corresponding holes in the upper and lower discs in alinement.

A harrow spike or tooth 40 projects through each pair of alined holes 39, extending downwardly below the discs 36 a substantial distance for engagement with the soil 41 of a crop row.

Each harrow spike or tooth is removably clamped to the discs 36 as follows:

Between such discs each harrow spike or tooth 40 passes through both legs of a tension yoke 42 disposed with the closed end outermost; there being a draw bolt 43 extending from said closed end radially outwardly through a cross block 44 which spans between and engages the edges of the discs 36. The cross blocks 44 have slots 45 into which the edges of the discs 36 project, whereby to hold said cross blocks 44 against displacement. By tightening the draw bolts 43, which tensions the yokes 42, the harrow spikes or teeth 40 are positively clamped against downward displacement, but can be readily removed for sharpening or replacement.

The spindles 31 are driven in unison whereby to correspondingly rotate the tillers 30, by the following mechanism:

A longitudinal drive shaft 46 is connected at its forward end to the power take-off shaft 47 of the tractor 4, and thence extends rearwardly and projects into a central gear housing 48 mounted on the frame 21 intermediate the ends thereof.

The drive shaft 46 is supported, intermediate its ends, by a bearing 49 on the upper end of a post 50 upstanding from the frame 1. Additionally, universal joints 51 and 52, together with a safety clutch 53, are interposed in the drive shaft 46.

Within the central gear housing 48 the shaft 46 is fitted with a bevel pinion 54 which drives a transverse-axis bevel gear 55 on a transverse double-ended output shaft 56. Such output shaft 56, at its opposite and outer ends, forms a part of a combination spline and universal joint 57. The combination spline and universal joints 57 are included in the inner ends of opposed, laterally outwardly projecting drive sleeves 58 which carry, in their outer ends, other combination spline and universal joints 59.

Transverse, outwardly projecting shafts 60, whose inner ends form a part of the joints 59, extend through caps 61 on the gear and spindle housings 32 of the related rotary tillers 30.

The shafts 60, within the cap portion 61 of each housing 32, carry a bevel pinion 62 which drives a generally horizontal lever gear 63 fixed on the upper end of the corresponding spindle 31. In the length thereof, and between the spindle housings 32, each shaft 60 has other combination spline and universal joints 64 and 65 interposed therein.

The joints 57, 59, 64, and 65—by reason of the splines—permit the housings 32 and rotary tillers 30 to be adjusted in their spacing. Additionally, the universal portions of said joints compensate for any vertical deflection which may occur in the transversely elongated mounting frame 21 during operation of the implement.

By reason of the described power driving mechanism, the rotary tillers 30 are positively and effectively rotated from the power take-off shaft 47 of the tractor.

When the described implement is in use, the piston stop screw 20 is initially set to regulate the height of the frame 1 above the ground, and consequently to set the working depth of the rotary tillers 30. Thus, even though the power cylinder 13 be employed to raise the frame 1 and tillers 30 for turning at the end of a row, or for transport from field to field, said tillers 30 automatically return to the same working depth when the power cylinder 13 is retracted.

Under certain working conditions the rotary tillers 30 may be run substantially horizontal, as in Fig. 1, while under other conditions the tillers must be tilted or canted upwardly at the front, as in Fig. 3. The adjustment, to so cant the rotary tillers 30, is accomplished by the manual turning, through the medium of the handles 29, of the turnbuckle bodies 28 in a direction to increase the effective length of the turnbuckles 24. With such increase in the effective length of the turnbuckles 24, the bellcrank levers 22 are rocked rearwardly about their pivots 23, tilting the mounting frame 21 in a manner to cant the tillers 30 upwardly at the front.

As the implement advances, the rotary tillers 30—i. e. the harrow spikes or teeth 40—effectively cultivate, weed, and mulch the corresponding crop row, breaking any crusting and conditioning the soil for proper crop growth.

From the foregoing description it will be readily seen that there has been produced such a device as will substantially fulfill the objects of the invention, as set forth herein.

While this specification sets forth in detail the present and preferred construction of the device, still in practice such deviations from such detail may be resorted to as do not form a departure from the spirit of the invention, as defined by the appended claim.

Having thus described the invention, the following is claimed as new and useful, and upon which Letters Patent are desired:

In a tillage implement, a main wheel-supported draft frame which includes transversely spaced side beams, a transverse tool-supporting frame disposed rearwardly of the main frame, bell-crank levers rigid with and extending forwardly from the transverse frame in longitudinally alined and overhanging relation to the side beams, means pivoting the levers intermediate their ends on the side beams at the rear end thereof, the bellcrank levers extending upwardly to their forward end from the pivot means in diverging relation to the side beams, and an adjustable turnbuckle unit for each lever extending between and pivotally connected at its ends to the related side beam of the main frame and to the forward end of said lever.

References Cited in the file of this patent

UNITED STATES PATENTS

| | | |
|---|---|---|
| 1,198,589 | Shellaberger | Sept. 19, 1916 |
| 1,610,587 | Randolph et al. | Dec. 14, 1926 |
| 1,879,666 | Erickson | Sept. 27, 1932 |
| 2,034,780 | Storey | Mar. 24, 1936 |
| 2,050,120 | Pizarro | Aug. 4, 1936 |
| 2,153,038 | Corbett | Apr. 4, 1939 |
| 2,228,865 | Bird | Jan. 14, 1941 |
| 2,323,278 | Silver | June 29, 1943 |
| 2,323,412 | Noble | July 6, 1943 |
| 2,521,417 | Sefcovic | Sept. 5, 1950 |
| 2,560,443 | Hosforth | July 10, 1951 |
| 2,560,641 | Goodlet | July 17, 1951 |
| 2,651,246 | Peters | Sept. 8, 1953 |

FOREIGN PATENTS

| | | |
|---|---|---|
| 8,777 | Great Britain | of 1841 |
| 276,339 | Switzerland | Nov. 1, 1951 |